J. L. WOODBRIDGE.
APPARATUS FOR CONTROLLING THE CHARGE OF STORAGE BATTERIES.
APPLICATION FILED OCT. 11, 1909.

1,033,508.

Patented July 23, 1912.

2 SHEETS—SHEET 1.

WITNESSES:
Robt R Kitchel
Frank C French

INVENTOR
Joseph L. Woodbridge
BY
Augustus B. Stoughton.
ATTORNEY.

J. L. WOODBRIDGE.
APPARATUS FOR CONTROLLING THE CHARGE OF STORAGE BATTERIES.
APPLICATION FILED OCT. 11, 1909.

1,033,508.

Patented July 23, 1912.

2 SHEETS—SHEET 2.

WITNESSES:

INVENTOR
Joseph L. Woodbridge
BY
Augustus B. Stoughton.
ATTORNEY.

UNITED STATES PATENT OFFICE.

JOSEPH L. WOODBRIDGE, OF PHILADELPHIA, PENNSYLVANIA.

APPARATUS FOR CONTROLLING THE CHARGE OF STORAGE BATTERIES.

1,033,508.  Specification of Letters Patent. Patented July 23, 1912.

Application filed October 11, 1909. Serial No. 522,144.

*To all whom it may concern:*

Be it known that I, JOSEPH L. WOODBRIDGE, a citizen of the United States, and a resident of Philadelphia, in the county of Philadelphia and State of Pennsylvania, have invented a certain new and useful Apparatus for Controlling the Charge of Storage Batteries, of which the following is a specification.

This invention relates to apparatus for charging storage batteries, and its principal object is to provide means for interrupting the charging current when the battery condition has been maintained at a certain point for a definite length of time without change.

Devices which have been proposed for automatically interrupting the charging current of a storage battery have heretofore depended upon opening the circuit when a predetermined voltage has been reached, or, in other cases, when the charging current has fallen off to a predetermined value. Such devices are open to the objection that any predetermined voltage or current which may be fixed for one set of conditions, as for example, for some particular temperature, will not be suitable when the conditions have changed, as for example, if the temperature be higher or lower. It is found preferable, instead of fixing a certain voltage to which the battery may be charged, and at which the charging current should be interrupted, to charge the battery at a fixed rate until the voltage reaches a maximum and is maintained at that maximum for a certain length of time without predetermining what that maximum should be.

The apparatus described below provides means for interrupting the charging circuit after the battery has reached a stationary condition and has been maintained at that point without change for a predetermined length of time. If charging at constant current rate, this stationary condition is indicated by the fact that the voltage has reached a maximum and has ceased to rise; if charging at constant potential it is indicated by minimum current; or it may be indicated by stationary specific gravity of the electrolyte.

The invention will be more clearly understood by reference to the following explanation in connection with the accompanying drawings, in which—

Figure 1:
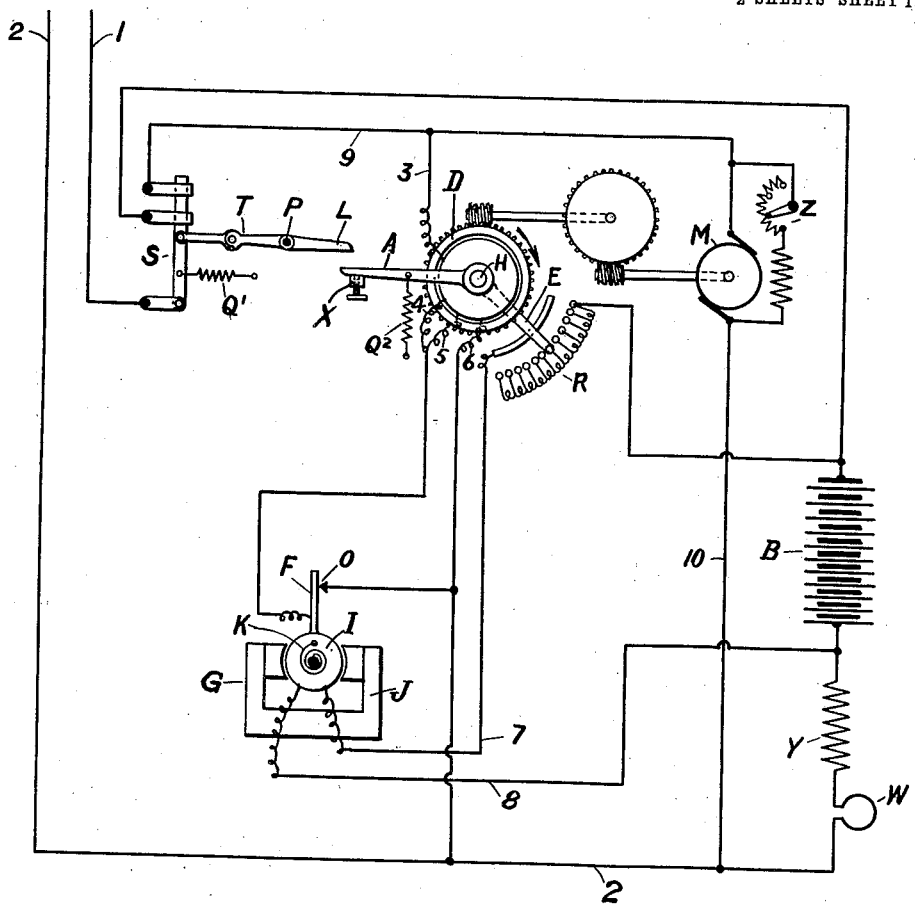
Figure 2:
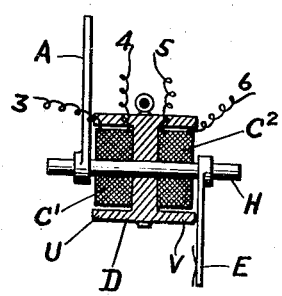
Figure 3:
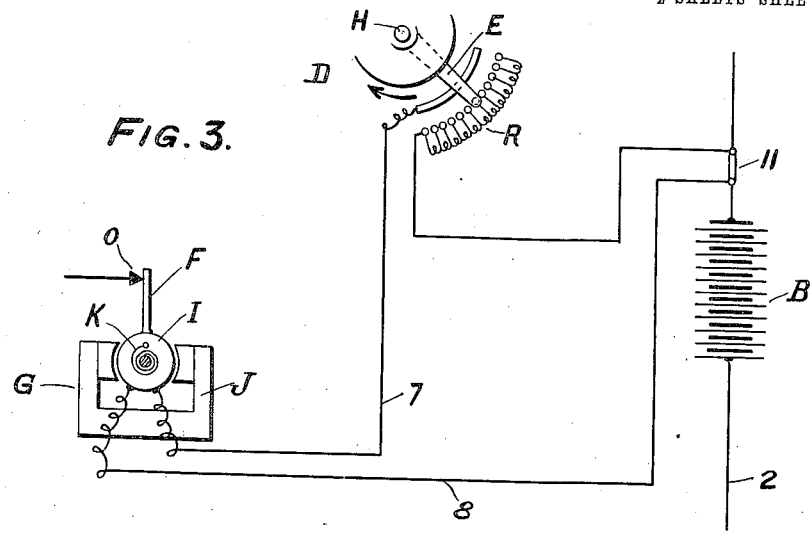
Figure 4:
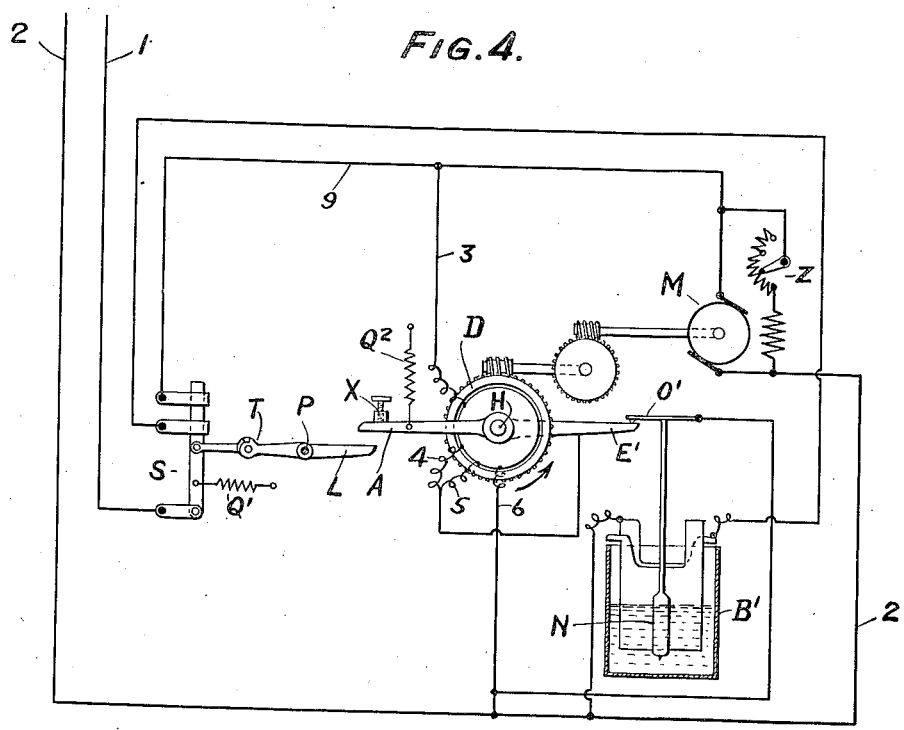

Figure 1, shows one embodiment of the invention, adapted to constant current charging. Fig. 2, is a sectional view of one of the devices shown in Fig. 1. Fig. 3, shows a modification adapted to constant potential charging, and Fig. 4, shows a modification in which the interruption of charging current is governed by the specific gravity of the electrolyte.

In Fig. 1 the battery B is connected by means of conductors 1—2 to any suitable source of charging current. An ordinary resistance Y is shown connected between one terminal of the battery and the source, and this resistance may be supplemented by a hot iron wire resistance W, which will serve to maintain the charging current constant in the well known manner. Between conductor 1 and the other terminal of the battery is a switch S, which is held in the closed position by the toggle T pivoted at the fixed point P. When the projecting end of the toggle lever L is raised by the arm A the switch S will be opened by the spring $Q^1$. It will be understood that any of the well known tripping devices may be used for opening the switch S.

The arm A is pivoted loosely on the shaft H and is held against the stop X by means of the spring $Q^2$. On the shaft H is fastened a drum of magnetic material D. The drum and shaft are driven in the direction indicated by the arrow by means of the motor M through a train of reducing gearing by which a very slow motion is imparted to the drum when current is supplied to the motor. The motor M is connected to the circuit 1—2, by means of conductors 9—10 and a second contact on the switch S, this contact being opened when the switch S is opened. On the shaft H is also loosely pivoted the arm E of a rheostat R. This part of the apparatus, the arms A and E, and the drum D, will be more clearly understood by reference to Fig. 2, which shows this device in section. The drum D is provided with two annular projections U and V, within which are located the exciting coils $C^1$ and $C^2$. The terminal leads of $C^1$ are shown at 3 and 4, and of $C^2$ at 5 and 6. The arms A and E are composed of magnetic material, and when current is supplied to the coil $C^1$ the arm A is drawn into contact with the projecting rim U and the friction between the arm and the rim thus produced will cause the arm to travel with the rim. If the excitation produced by the coil $C^1$ is maintained long enough the arm A will move away from the stop X shown in Fig. 1, and will finally strike the lever L and trip the switch S. If the coil $C^2$ is excited by suitable current the arm E will be held against the rim V and travel with it, this travel being in the direction to increase the resistance of rheostat R shown in Fig. 1.

The excitations of the coils $C^1$ and $C^2$ are controlled by the relay G in Fig. 1. The two coils $C^1$ and $C^2$ are connected in series between conductor 9 and conductor 2. Normally the terminals 5—6 of the coil $C^2$ are short-circuited by the contact between the finger F of the relay G and the contact point O. Under these conditions there will be a sufficient flow of current through coil $C^1$ to hold the arm A against the drum D and this arm will then follow the motion of the drum. When the contact between F and O is broken, current will flow through the coil $C^2$, and motion will be imparted to the arm E. Under these conditions, however, the additional resistance of coil $C^2$, being included in series with coil $C^1$, will be sufficient to reduce the current in coil $C^1$ to such a point that the arm A will be released and will no longer follow the motion of the drum D, but will be drawn back by the spring $Q^2$ against the stop X. The relay G consists of a pivoted armature I, which may rotate between the pole pieces of a permanent magnet J. The finger F is mechanically attached to the armature I, and the spiral spring K normally holds the finger F in contact with the point O. The armature I is electrically connected across the terminals of the battery B, with the rheostat R connected in series.

At any particular position of the arm E of the rheostat R, if the voltage of the battery B rises sufficiently, the torque exerted on the armature I will be sufficient to overcome the force of the spring K and the contact at O will be opened. If now the arm E of the rheostat R be moved so as to include a greater resistance in the circuit the torque of the armature I will be reduced and the contact at O will be closed again.

The operation of the apparatus above described will then be as follows:—The switch S being closed and held in the closed position by the toggle T, charging current is supplied to the battery B, and current is also supplied to the motor M, which imparts a slow rotation to the drum D in the direction of the arrow. The arm E of the rheostat R is set at such a point that the armature I of the relay G has sufficient torque to open the contact at O. This opens the short circuit around the coil $C^2$, which is then energized, and the arm E is drawn against the drum D, which imparts a motion to it in the direction to increase the resistance of the rheostat R. This motion continues until this resistance is sufficiently increased to allow the armature I and the finger F to be drawn back by the spring K so as to make contact at O. This will short-circuit the coil $C^2$, releasing the arm E, which will then cease to move. The closing of the contact at O, will, however, energize the coil $C^1$ sufficiently to draw the arm A against the drum D and impart motion to this arm, which will then leave the stop X and move toward the lever L. If this condition is maintained for a sufficient length of time the arm A will come in contact with L and trip the switch S. If, however, before this happens the voltage of the battery B shall rise by a small amount, this increase will be sufficient to increase the torque of the armature I of the relay G and open the contact at O, whereupon the arm A will be immediately released and will be drawn back again against the stop X, while the arm E will again be set in motion, increasing the resistance of the rheostat R until the contact at O is closed again. This cycle of operations will continue so long as the voltage of the battery B is rising at a rate sufficient to open the contact at O before the arm A has had time to come in contact with the lever L. The time required for the arm A to move from the stop X to the lever L may be adjusted in a number of different ways, as, for example, by adjusting the distance between the stop X and the lever L, or by varying the speed of the motor M by means of the rheostat Z in its field circuit, or in other well known way.

In Fig. 3, a modification of the apparatus of Fig. 1, is shown, adapting it to control the duration of charge in response to battery current instead of battery voltage. This permits the apparatus to be used in cases where the battery is charged at constant potential across its terminals in which case the battery current gradually diminishes as the battery becomes more fully charged and finally reaches a minimum and remains constant when the battery is full. In this arrangement the armature of the relay G is connected across a shunt 11, in the battery circuit instead of across the battery terminals, so that the torque of the armature will vary with the battery current. The contact O is placed on the opposite side of the finger F so that the torque of the armature tends to close this contact while the spiral spring K tends to open it. The rheostat R is connected in series with the armature of the relay in such a way that motion of the arm E in the direction of the arrow will reduce the resistance in circuit. The rest of the apparatus will be the same as in Fig. 1. As the current in the battery circuit falls off the torque of the armature I becomes less until finally the force of the spring K predominates and the contact at O is opened. As explained in connection with Fig. 1 this will release the arm A which will fall back against the stop X and will start moving the arm E in the direction of the arrow. This motion in the case illustrated in Fig. 3 will cut out resistance from the rheostat R, increasing the torque of the armature I and restoring the contact at O. This cycle will be repeated until the battery current has remained stationary for a sufficient length of time to permit the arm A to trip the switch S.

In Fig. 4, a modification of the apparatus is shown adapting it to control the duration of charge in response to the specific gravity of the electrolyte. A hydrometer N is shown floating in the cell B¹ which is being charged. The stem of this hydrometer is arranged to lift a contact finger O¹ as the specific gravity of the cell increases. This finger O¹ makes contact with the arm E¹ which is pivoted on the shaft H in the same manner as arm E in Fig. 1. The direction of motion of the drum D in Fig. 4, is opposite to that shown in Fig. 1, so that the arrangement of arm A and of the toggle trip L is reversed but in other respects the apparatus is the same as described in connection with Figs. 1 and 2. So long as the finger O¹ is in contact with the arm E¹, coil C² (see Fig. 2) will be short-circuited and coil C¹ will be energized imparting motion to the arm A. As the battery becomes more fully charged the specific gravity of the electrolyte will rise, raising the hydrometer N, thus lifting the finger O¹ and opening the contact between this finger and the arm E¹. As described in connection with Fig. 1, this will release the arm A which will be drawn back against the stop X, and at the same time motion will be imparted to the arm E¹, bringing it again in contact with the finger O¹. This cycle of operations will be repeated until the specific gravity of the electrolyte ceases to rise for a sufficient length of time to permit the arm A to trip the switch S.

It will be understood that modifications may be made in the details of the apparatus without departing from the spirit of the invention as defined in the appended claims.

What I claim as new and desire to secure by Letters Patent is:

1. In combination a storage battery and its source of charging current, and automatic means for disconnecting the battery from the source after the battery condition with respect to its state of charge has remained stationary for a predetermined length of time.

2. In combination a storage battery, and its source of charging current, automatic means adapted to disconnect the battery from the source after the battery condition with respect to its state of charge has remained stationary for a predetermined interval of time, and means for adjusting said interval.

3. In combination a storage battery and its source of charging current, a switch connected between the source and the battery, a tripping device for opening the switch, said device including a movable member adapted to trip the switch after a predetermined travel from its initial position and a continuously moving member, normally engaged with the movable member, and means responsive to a change in the battery condition and adapted to disengage said members and restore the movable member to its initial position.

4. In combination a storage battery and its source of charging current, a switch connected between the source and the battery, a tripping device for opening the switch, said device including a movable member adapted to trip the switch after a predetermined travel from its initial position and a continuously moving member normally engaged with the movable member, means to disengage said members and restore the movable member to its initial position in response to a change in the battery condition, and means adapted to reëngage said members after said change in battery condition.

5. In combination a storage battery and its source of charging current, a switch connected between the battery and the source, means including a movable member adapted to open said switch after a predetermined travel of said movable member from its normal position, means for imparting motion to the movable member and means responsive to a change in the battery condition and adapted to restore the movable member to its normal position.

6. In combination a storage battery and its source of charging current, means including a movable member adapted to disconnect the battery from the source after a predetermined travel of said movable member from its normal position, means for imparting motion to the movable member and means for restoring said member to its normal position in response to a change in the battery condition.

7. In combination a storage battery and its source of charging current, means including a movable member adapted to disconnect the battery from the source after a predetermined travel of said movable member from its normal position, means for imparting motion to the movable member, and means for restoring said member to its normal position from any point to its travel in response to a change in the battery condition.

8. In combination a storage battery and its source of charging current, means including a movable member for disconnecting the battery from the source after a predetermined travel of said movable member from its normal position, means for imparting motion to said movable member and means responsive to change in the battery condition for interrupting the travel of said movable member at a point in its travel prior to the opening of the battery circuit and restoring said member to its normal position.

9. In combination a storage battery and its source of charging current, means including a movable member for disconnecting the battery from the source after a predetermined travel of the movable member from its normal position, means for imparting motion to said movable member and means adapted to restore said member to its normal position in response to a change of electrical condition in the battery circuit.

10. In combination a storage battery and its source of charging current, a movable arm normally held in its initial position at one extreme of its travel, a tripping device at the other extreme of said travel adapted when actuated by said arm to disconnect the battery from the source, moving means adapted when engaged with said arm to impart motion thereto, a device for causing said moving means to engage with said arm, and means for disengaging said arm and permitting it to resume its initial position in response to a change of electrical condition in the battery circuit.

11. In combination a storage battery and its source of charging current, a movable arm normally held in its initial position at one extreme of its travel, a tripping device at the other extreme of said travel, adapted when actuated by said arm to disconnect the battery from the source, moving means adapted when engaged with said arm to impart motion thereto, a device for causing said moving means to engage with said arm, means for disengaging said arm and permitting it to resume its initial position in response to a change of electrical condition in the battery circuit, and means for causing the moving means to reëngage with the arm after said change.

12. In combination a storage battery and its source of charging current, a movable arm normally held in its initial position at one extreme of its travel, a tripping device at the other extreme of said travel adapted when actuated by said arm to disconnect the battery from the source, moving means adapted when engaged with said arm to impart motion thereto, a magnetic device including an exciting coil for causing said moving means to engage with said arm, a relay connected to the battery circuit and adapted in response to a change of electrical condition in said circuit to reduce the excitation of the coil to release the arm and permit it to resume its initial position, and means for restoring the excitation of the coil after said action of the relay whereby the moving means is reëngaged with said arm.

13. In combination a storage battery and its source of charging current, a movable arm normally held in its initial position at one extreme of its travel, a tripping device at the other extreme of said travel adapted when actuated by said arm to disconnect the battery from the source, moving means adapted when engaged with said arm to impart motion thereto, a device for causing said moving means to engage with said arm, and means for adjusting the interval of time required for the arm to complete its travel from its initial position to the tripping device.

14. In combination a storage battery and its source of charging current, a movable arm normally held in its initial position at one extreme of its travel, a tripping device at the other extreme of said travel adapted when actuated by said arm to disconnect the battery from the source, moving means adapted when engaged with said arm to impart motion thereto, a device for causing said moving means to engage with said arm, means for disengaging said arm and permitting it to resume its initial position in response to a change of electrical condition in the battery circuit, and means for adjusting the interval of time required for the arm to complete its travel from its initial position to the tripping device.

15. In combination a storage battery and its source of charging current, a movable arm normally held in its initial position at one extreme of its travel, a tripping device at the other extreme of said travel adapted when actuated by said arm to disconnect the battery from the source, moving means adapted when engaged with said arm to impart motion thereto, a magnetic device including an exciting coil for causing said moving means to engage with said arm, a relay connected to the battery circuit and adapted in response to a change of electrical condition in said circuit to reduce the excitation of the coil to release the arm and permit it to resume its initial position, and means for adjusting the interval of time required for the arm to complete its travel from its initial position to the tripping device.

16. In combination a storage battery and its source of charging current, a movable tripping arm normally held in its initial position at one extreme of its travel, a tripping device at the other extreme of said travel adapted when actuated by said arm to disconnect the battery from the source, a relay connected to the battery circuit, a rheostat in circuit with said relay and having a movable arm to vary its resistance, moving means adapted to impart motion to the tripping arm and the rheostat arm when engaged therewith, magnetic devices including exciting coils for engaging said moving means with said arms, and connections from the relay to the exciting coils whereby in response to a change in the electrical condition of the battery circuit the tripping arm is released and permitted to resume its initial position while the rheostat arm is engaged with the moving means to restore the original condition of the relay and reëngage the tripping arm with the moving means.

In testimony whereof I have hereunto signed my name.

JOSEPH L. WOODBRIDGE.

Witnesses:
W. M. ELY,
W. W. McMAHON.